(12) United States Patent
Rill et al.

(10) Patent No.: US 8,002,339 B2
(45) Date of Patent: Aug. 23, 2011

(54) SIDE SILL OF A VEHICLE BODY

(75) Inventors: Roland Rill, München (DE); Oliver Meyer, Landsberg (DE); Horst Schuster, Olching (DE); Paul Blowing, München (DE)

(73) Assignee: Bayerische Motoren Werke AG, Munich (DE)

( * ) Notice: Subject to any disclaimer, the term of this patent is extended or adjusted under 35 U.S.C. 154(b) by 157 days.

(21) Appl. No.: 12/375,193

(22) PCT Filed: Jul. 24, 2007

(86) PCT No.: PCT/EP2007/006546
§ 371 (c)(1),
(2), (4) Date: Jan. 26, 2009

(87) PCT Pub. No.: WO2008/012055
PCT Pub. Date: Jan. 31, 2008

(65) Prior Publication Data
US 2009/0261622 A1 Oct. 22, 2009

(30) Foreign Application Priority Data

Jul. 28, 2006 (DE) .................. 10 2006 034 977

(51) Int. Cl.
*B60J 7/00* (2006.01)
(52) U.S. Cl. .............. 296/209; 296/108; 296/146.9
(58) Field of Classification Search ............ 296/187.01, 296/187.03, 187.12, 193.01, 193.05, 203.01, 296/205, 203.03, 209, 108
See application file for complete search history.

(56) References Cited

U.S. PATENT DOCUMENTS

| | | | |
|---|---|---|---|
| 4,848,835 A * | 7/1989 | DeRees | 296/204 |
| 4,944,553 A | 7/1990 | Medley et al. | |
| 6,053,564 A * | 4/2000 | Kamata et al. | 296/187.09 |
| 6,193,306 B1 | 2/2001 | Lee | |
| 6,283,539 B1 | 9/2001 | Enning et al. | |
| 6,386,625 B1 | 5/2002 | Dukat et al. | |
| 6,409,257 B1 * | 6/2002 | Takashina et al. | 296/209 |
| 6,648,404 B2 * | 11/2003 | Yakata et al. | 296/209 |
| 6,709,047 B2 * | 3/2004 | Burge | 296/209 |
| 7,118,170 B2 * | 10/2006 | Montanvert et al. | 296/209 |

(Continued)

FOREIGN PATENT DOCUMENTS

DE 4140426 6/1993

(Continued)

OTHER PUBLICATIONS

International Search Report for PCT/EP2007/006546.

(Continued)

*Primary Examiner* — Glenn Dayoan
*Assistant Examiner* — SunSurraye Westbrook
(74) *Attorney, Agent, or Firm* — Muncy, Geissler, Olds & Lowe PLLC

(57) ABSTRACT

A side sill of a body of a motor vehicle of sheet metal shell construction is composed of a sheet metal outer shell and a sheet metal inner shell which are welded to one another. A rolled profile for stiffening can be inserted into the side sill from an open end side and can be fastened to the side sill. In this way, a side sill can be stiffened by assembling the rolled profile after the basic construction of the body of the motor vehicle.

12 Claims, 1 Drawing Sheet

U.S. PATENT DOCUMENTS

| | | |
|---|---|---|
| 7,494,180 B2 * | 2/2009 | Rill .............................. 296/209 |
| 2009/0146457 A1 * | 6/2009 | Kanagai et al. .......... 296/187.12 |
| 2010/0207426 A1 * | 8/2010 | Tsuruta et al. ........... 296/187.12 |

FOREIGN PATENT DOCUMENTS

| | | |
|---|---|---|
| DE | 19528874 | 2/1997 |
| DE | 19538844 | 4/1997 |
| DE | 19708215 | 7/1997 |
| DE | 19904630 | 8/2000 |
| DE | 19954292 | 5/2001 |
| DE | 10003878 | 8/2001 |
| DE | 102004002297 | 8/2005 |
| EP | 1099584 | 5/2000 |
| JP | 2001-018784 | 1/1989 |
| JP | 2005-270447 | 10/1993 |
| WO | WO 2006089652 A1 * | 8/2006 |

OTHER PUBLICATIONS

German Search Report for DE 10 2006 064 977,6.

* cited by examiner

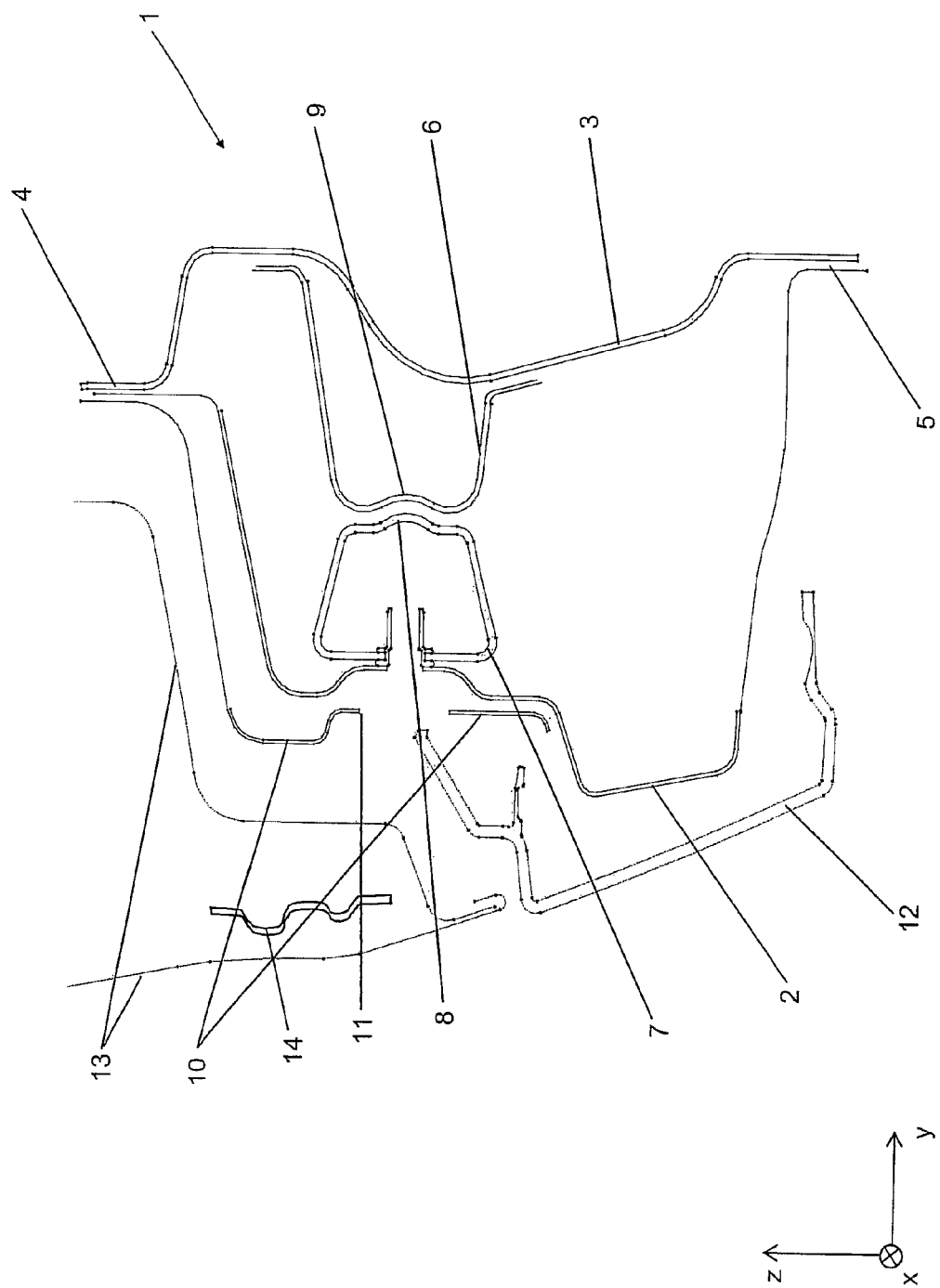

SIDE SILL OF A VEHICLE BODY

CROSS-REFERENCE

This application is the U.S. national stage filing of International Application No. PCT/EP2007/006546, filed Jul. 24, 2007, which claims priority to German patent application No. 10 2006 034 977.6, filed Jul. 28, 2006.

TECHNICAL FIELD

This invention is related to a system for reinforcement a side sill of a vehicle.

BACKGROUND ART

A side sill of a vehicle body consisting of an extruded sill profile is known from DE 10 2004 002 297 A1. An additional extruded reinforcement profile inserted into the extruded sill profile provides local reinforcement along the length of the side sill. The wall areas of the two profiles at least partially abut each other and may be coupled to each other, for example, via rivets and/or bolts. The extruded sill reinforcement profile may be inserted from an open face side of the extruded sill profile up to a reinforcement portion. However, improved methods of reinforcing a side sill are desirable.

It is an object of the invention to provide a side sill of a vehicle body that can easily be reinforced by an additional reinforcement member.

This object is solved by a side sill of a vehicle, comprising an outer shell, an inner shell coupled to the outer shell, and a space located between the outer shell and the inner shell and adapted to receive a roll profile, wherein the inner and outer shells are, after being coupled to each other, adapted to receive the roll profile into the space after body frame work for the vehicle is substantially completed. Further, the object is solved by a roll profile located in the space between the outer and inner shell and coupled to the outer shell.

In another embodiment, a convertible vehicle assembly comprises a roll profile comprising a material having a stiffness of at least 800 MPa, a first plurality of holes, a convex portion of a cross-section of the roll profile; a side sill, comprising an outer shell comprising an outer shell top flange, an outer shell bottom flange, and a second plurality of holes, wherein the first and second pluralities of holes are positioned to correspond to each other; and an inner shell comprising an inner shell top flange, an inner shell bottom flange, and a profile portion having a cross-section having a concave portion, wherein the inner and outer shells are coupled to each other by welding the top flanges together and welding the bottom flanges together; bolts located in the first and second pluralities of holes such that the outer shell and the roll profile are coupled to each other; wherein the roll profile is inserted into a space between the inner and outer shells after vehicle body work is substantially completed such that the concave portion faces the convex portion of the roll profile.

SUMMARY

According to the invention, a side sill of a body of a vehicle shell constructed at least partially of sheet metal is made of an inner- and outer shell comprised of sheet metal and welded to each other. A roll profile for reinforcement can be inserted into the side sill from an open face side and can be mounted to the side sill. In this way, the side sill can be reinforced by mounting the roll profile after the body frame work of the vehicle is completed. This may be a major advantage for the production of, for instance, different derivatives of a vehicle model. The body of a convertible car has a lower stiffness than the body of a sedan car of the same vehicle model, due to the absence of a roof. The body of a convertible car therefore requires a side sill that has a higher lateral stiffness. The side sill according to the invention allows for manufacturing the same side sill in body shell work for the convertible car as well as for the sedan car, and consequently, no manufacture of different types is required during the body shell work. Subsequently to the body shell work, the body of the convertible car is reinforced by inserting the roll profiles into the side sills so that this body, too, has an adequate stiffness. The open face side is closable with a closing member so that no dampness or dirt can enter the side sill via the face side.

The roll profile is a member that can be easily manufactured of plates that may be made of super high strength types of steel, i.e. the plates may have yield stress of 800 MPa or more. Therefore, the roll profile may meet highest stiffness requirements despite comparatively small wall thicknesses, so that the weight of the roll profile with regard to its stiffness is extremely low.

The roll profile in the side sill preferably extends at least from the portion of an A-pillar up to a portion of a rear plate of the vehicle body. The A-pillars form the front limitation of the passenger compartment. The lower cowl, which forms the lower support for the windshield, and a supporting tube of the instrument panel, extend between the right and left A-pillars. The rear plate forms the rear limitation of the foot space in the passenger compartment. The so-called seat cross member extends in the region of the rear plate, and connects the two side sills in the rear portion in the transverse direction of the vehicle. If the roll profile extends from the portion of an A-pillar up to a portion of a rear plate, it can, in case of a side collision, absorb the arising forces together with the actual side sill, and can conduct the forces to the front via the A-pillar or via the lower cowl and the supporting tube, as well as to the rear via the seat cross member, without causing a significant deformation of the passenger compartment. This is of major importance for avoiding injuries of the passengers.

Subsequently to the body shell work, the roll profile can be easily inserted into the side sill and mounted thereto. Particularly suitable fixing methods are spot welding and screwing. Spot welding is a particularly simple and therefore economic connection method. Screwing, in contrast, allows for the use of different materials. Instead of a rolled steel plate, the roll profile may, therefore, also be made of CFRP, or it may be a carrier filled with aluminium-structural foam, or alternatively, an aluminium extruded profile. If the outer shell of the side sill has appropriate screwing holes for all derivatives, and no roll profile has to be inserted for additional reinforcement into the side sill of the just built vehicle for additional reinforcement, the holes can be closed with plugs.

Advantageously, a profile sheet having a hat-shaped cross-section is welded by its two edges onto the side of the inner shell facing the outer shell, which profile sheet extends in a longitudinal direction of the vehicle and is arranged oppositely to the roll profile in the transverse direction of the vehicle. Said profile sheet reinforces the inner shell of the side sill. In case of a side crash, e.g. with a side post, a deformation of the outer shell together with the roll profile that is fixed thereto is caused when the acting forces are great. After only a small deformation, the roll profile then abuts on the profile sheet, so that the roll profile, together with the inner shell, also contributes to the absorption of the crash forces. The clearance between the roll profile and the profile sheet is therefore chosen to be relatively small. The clearance preferably lies within the range of two to five millimetres.

The teachings of the present invention are described in detail below with reference to the FIGURE, which shows an exemplary embodiment of the invention.

DESCRIPTION OF THE DRAWINGS

The FIGURE shows a cross-sectional view of a side sill of a vehicle body, according to an example.

DETAILED DESCRIPTION

The FIGURE shows a side sill 1, which extends in a longitudinal direction (x) of the vehicle from an A-pillar of the vehicle body up to a rear wheel housing. The side sill 1 is built in shell construction and has an outer shell 2 and an inner shell 3 made of steel sheet metal. Here, the outer shell 2 was hot shaped from a high strength plate having a yield stress of 1,000 MPa. Together, the outer shell 2 and the inner shell 3 form an upper and a lower flange 4 and 5, via which flanges they are coupled to each other. On the side of the inner shell 3 facing the outer shell 2, a hat-shaped profile sheet 6, which reinforces the inner shell, is arranged in the longitudinal direction (x) of the vehicle. The profile sheet 6 extends over the entire length of the side sill 1. It is made of hot shaped high strength steel, i.e. steel having a yield stress of at least 1,000 MPa.

A roll profile 7 that extends in the longitudinal direction (x) of the vehicle is coupled to the side of the outer shell 2 facing the inner shell, and opposite to the hat-shaped profile sheet 6. The roll profile 7 is made of high strength steel, i.e. it has a yield stress of more than 800 MPa. It extends inside the side sill 1 from the area of the A-pillar up to the area of a seat cross member, which seat cross member extends in transverse direction (y) below a backseat and connects the two side sills 1 of the vehicle body. The roll profile 7 may be coupled to the outer shell 2 via seven equally spaced bolts. Only a small clearance of about three millimeters remains between the hat-shaped profile sheet 6 and the roll profile 7. The wall portion 8 of the roll profile 7, which faces the hat-shaped profile sheet 6, has a convex cross-section, while the wall portion 9 of the hat-shaped profile sheet 6, which faces the roll profile 7, is accordingly formed concavely. Without the clearance between the roll profile 7 and the hat-shaped profile sheet 6, the surface of the wall portion 8 of the roll profile and the wall portion 9 of the hat-shaped profile sheet 6 would be flush against each other to form a positive fit in height direction (z).

The side sill 1 is concealed by an outer side wall 10 in the upper portion on the outer side, formed by the outer shell 2. The outer side wall 10 forms the visible outer covering of the passenger compartment. It is made of thin steel sheet metal, which, due to the required deformation of the outer side wall 10, cannot be made of super high strength steel. The outer side wall 10 is, therefore, mainly used as an aesthetic covering and does not have an important supporting function. In the area of the bolted connections between the roll profile 7 and the outer shell 2, the outer side wall 10 is provided with recesses 11 in order to make the areas of the bolted connections accessible from the outside. These recesses 11 can be closed with plugs. The lower area of the outer side of the side sill 1, which is not covered by the outer side wall 10, is covered with a plastic covering 12.

The side sill 1 forms the lower limitation of the side door opening of the body. The door opening can be closed with a side door 13, which, in the closed position, overlaps the side sill 1 in height direction (z) by approximately thirty millimetres. In the lower section of the side door 13, at height of the side sill 1, a crash reinforcement 14 made of high-strength steel is arranged, which crash reinforcement extends over the entire length of the side door 13.

In the event of a side crash, the crash energy, which may impact the side door 13 at a single or at isolated contact points, is distributed by the crash reinforcement 14 over the entire length of a bottom portion of the side door 13. Thereby, the side door 13 deforms, so that it abuts the side sill 1. The highly stiff side sill 1 then distributes the remaining crash energy over the entire length of the side sill 1 and leads it into the A-pillar and into the seat cross member, so that the passenger compartment is protected. Here, at high forces, the outer shell 2 and the roll profile 7 connected thereto will deform until the roll profile 7 abuts on the hat-shaped profile sheet 6. From this point of time, the side sill 1 has its maximal stiffness, as the outer shell 2, the roll profile 7, the hat-shaped profile sheet 6 and the inner shell 3 contribute to the stiffness to their full extent. All in all, the stiffness of the side sill 1 is so high, that even a local penetration of a post into the side of the vehicle body does not pose a danger for the passengers in the passenger compartment.

The side sill 1 shown in the FIGURE has a very high stiffness. Such high stiffness is in particular required in convertible cars, as the total stiffness of the vehicle body of a convertible car is clearly below the total stiffness of a sedan car of the same vehicle type, due to the absence of a roof. It, therefore, may be that a less stiff side sill is completely sufficient for the required total stiffness of the body of a sedan car. The side sill 1 according to the invention makes it possible to omit the roll profile in this case, so that by these methods, an adaptation to different derivates of one vehicle type is possible.

The roll profile 7 is designed as an assembling part. In vehicle derivatives that require the roll profile order to improve the stiffness of the vehicle frame, the roll profile may be inserted into the side sill 1 from an outwardly facing side thereof and may there be coupled to the outer shell 2. Subsequently, the face side is closed by a cover. The formation of the derivatives therefore takes place in the course of the final assembly of the vehicles, after the body shell work. Therefore the type of vehicle being constructed does not have to be determined in the body shell work stage. This considerably simplifies the body shell work. Moreover, the reduced side sill 1 can be formed by simply not mounting the roll profile 7. The reduced side sill has the advantage that it is considerably lighter and more cost-efficient. It is, however, subject to the condition that the total stiffness of the vehicle is nevertheless sufficiently high.

According to an aspect of the invention, a side sill (1) of a vehicle body in sheet metal shell construction comprises at least an outer shell (2) and an inner shell (3) of sheet metal, which are welded to each other adapted to receive a roll profile (7) for reinforcement that is insertable into the side sill (1) from an open face side and is fixable to the side sill (1).

According to another aspect of the invention, the roll profile (7) in the side sill (1) extends at least from the area of an A-pillar to the area of a rear plate of the vehicle body.

According to yet another aspect of the invention, the roll profile (7) can be screwed and/or spot welded to the side sill (1).

According to yet another aspect of the invention, the roll profile (7) is made of a metal sheet with super high strength material quality.

According to yet another aspect of the invention, the side sill (1) further comprises a profile sheet (6) having a hat-shaped cross-section and welded to the side of the inner shell (3) facing the outer shell (2), the profile sheet extending in the longitudinal direction (x) of the vehicle, and being opposite to the roll profile (7) oriented in the transverse direction (y) of the vehicle.

According to yet another aspect of the invention, the hat-shaped profile sheet (6) and the roll profile (7) are arranged with a clearance of between 2 and 5 mm between them.

According to yet another aspect of the invention, the hat-shaped profile sheet (6) is made of hot shaped, high strength steel.

According to yet another aspect of the invention, the outer shell (2) is made of high strength, hot shaped metal sheet.

According to yet another aspect of the invention, the side sill (1) further comprises an outer side wall (10) of the vehicle body at least partially overlapping the side sill (1).

According to yet another aspect of the invention, further comprising at least one side door (13) overlapping the side sill (1) in height direction (z).

The invention claimed is:

1. A side sill of a vehicle, comprising:
   an outer shell,
   an inner shell coupled to the outer shell,
   a space located between the outer shell and the inner shell and adapted to receive a roll profile,
   wherein the inner and outer shells are, after being coupled to each other, adapted to receive the roll profile into the space after body frame work for the vehicle is substantially completed, and
   the side sill further comprising:
   a convex portion of a cross-section of the roll profile located on the roll profile such that the convex portion faces the inner shell when the roll profile is inserted in the space between the inner and outer shells, and
   a profile member, wherein the profile member is adapted to lie proximally to the inner shell in the space between the inner and outer shells, and wherein a cross-section of the profile member comprises a concave portion located on the inner shell such that the concave portion faces the convex portion of the roll profile when the roll profile is inserted in the space between the inner and outer shells.

2. The side sill of claim 1, wherein the roll profile comprises high-strength steel having a stiffness of at least 800 MPa.

3. The side sill of claim 1, wherein the roll profile comprises a carbon fiber reinforced polymer.

4. The side sill of claim 1, wherein the roll profile is screwed to a side of the outer shell facing the inner shell.

5. The side sill of claim 1, wherein the roll profile is spot-welded to the outer shell.

6. The side sill of claim 1, wherein the inner and outer shell further comprise top flange portions and bottom flange portions, and wherein the inner and outer shells are coupled by welding the top flange portions together and welding the bottom flange portions together.

7. The side sill of claim 1, wherein, when the roll profile is inserted between the inner and outer shells, a clearance of 2-5 mm is between concave and convex portions.

8. A side sill according to claim 1, wherein the roll profile extends at least from an area of an A-pillar of the vehicle body to an area of a rear plate of the vehicle body.

9. A side sill according to claim 1, further comprising at least one outer side wall of the vehicle, wherein the at least one outer side wall at least partially overlaps the side sill.

10. A side sill according to claim 1, further comprising a covering at least partially composed of plastic, wherein the covering extends in the longitudinal direction of the vehicle, and wherein the covering at least partially covers the outer shell.

11. A convertible vehicle assembly, comprising:
    a roll profile comprising:
    a material having a stiffness of at least 800 MPa,
    a first plurality of holes,
    a convex portion of a cross-section of the roll profile;
    a side sill, comprising:
    an outer shell comprising:
    an outer shell top flange,
    an outer shell bottom flange, and
    a second plurality of holes, wherein the first and second pluralities of holes are positioned to correspond to each other;
        an inner shell comprising:
            an inner shell top flange,
            an inner shell bottom flange, and
            a profile portion having a cross-section having a concave portion,
    wherein the inner and outer shells are coupled to each other by welding the top flanges together and welding the bottom flanges together; and
    bolts located in the first and second pluralities of holes, wherein the bolts couple the outer shell and the roll profile to each other;
    wherein the roll profile is inserted into a space between the inner and outer shells after vehicle body work is substantially completed such that the concave portion faces the convex portion of the roll profile.

12. The side sill of claim 11, wherein a clearance of 2-4 mm is provided between concave and convex portions.

* * * * *